June 17, 1924.

J. H. IGO

AUTOMOBILE BUMPER

Filed Feb. 12, 1923

1,498,039

Inventor
Joseph H. Igo
by Eugene Cwan Atty

Patented June 17, 1924.

1,498,039

UNITED STATES PATENT OFFICE.

JOSEPH H. IGO, OF CHICAGO HEIGHTS, ILLINOIS, ASSIGNOR TO IGO MANUFACTURING CO., OF CHICAGO, ILLINOIS.

AUTOMOBILE BUMPER.

Application filed February 12, 1923. Serial No. 618,489.

*To all whom it may concern:*

Be it known that I, JOSEPH H. IGO, a citizen of the United States, residing at Chicago Heights, in the county of Cook and State of Illinois, have invented new and useful Improvements in Automobile Bumpers, of which the following is a specification.

This invention relates to automobile bumpers, particularly adapted for the rear ends of automobiles.

The main object of my invention is to provide the bumper with a removable mid-section so that a clear space may be provided at the rear of the car when it is desired to remove the spare wheel or spare tire usually carried at the rear of the machine.

The invention consists further in the matters hereinafter described and more particularly set forth in the appended claims.

In the accompanying drawings—

Figure 1:
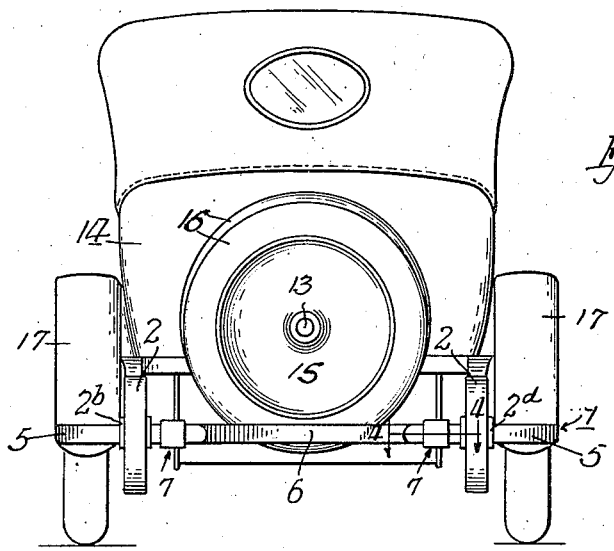
Fig. 1 is a rear view of an automobile equipped with a bumper construction of my invention.
Figure 2:
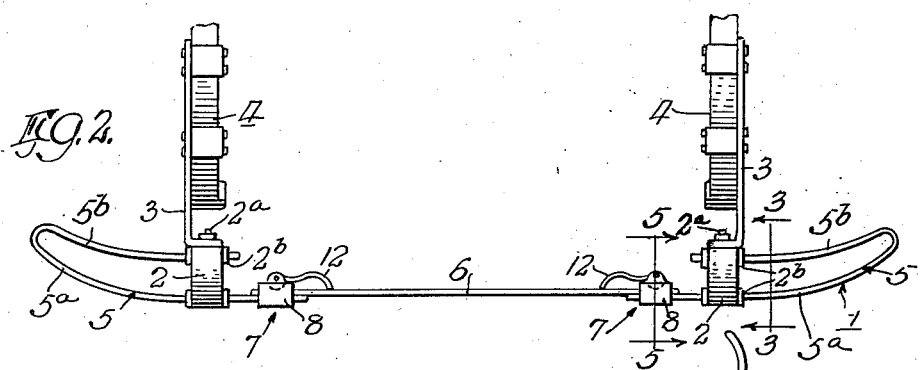
Fig. 2 is an enlarged top plan view of the bumper device of Fig. 1.
Figure 3:
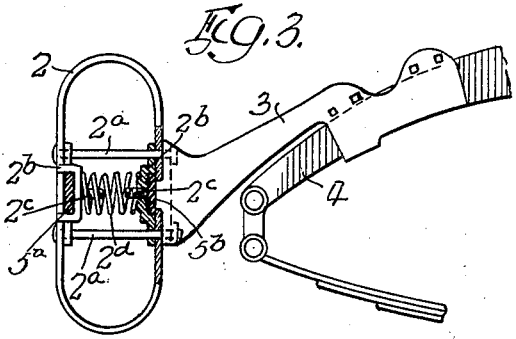
Fig. 3 is a vertical sectional view taken on line 3—3 of Fig. 2.
Figure 4:
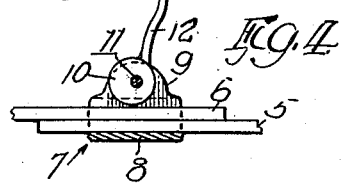
Fig. 4 is a detail view of one of the clamp devices to be hereinafter described and taken on line 4—4 of Fig. 1.

The bumper construction of my invention comprises a horizontally arranged bumper bar 1 extending across the rear end of an automobile, as shown in Fig. 1. This bar is supported by vertical guard members 2, 2 arranged adjacent the ends of the bar, and these guard members are attached to brackets 3, 3, by means of which the bumper device is clamped or otherwise attached to the side members 4, 4 of the automobile frame or chassis at the rear end of the car, as shown in Fig. 2.

The bar 1 is made of spring steel or other suitable material and is divided into end sections 5, 5, and a removable mid-section 6. The latter is located between the vertical guards 2, 2, and is releasably clamped to the adjacent ends of the end sections 5, 5 by clamp devices 7, 7.

Figure 5:
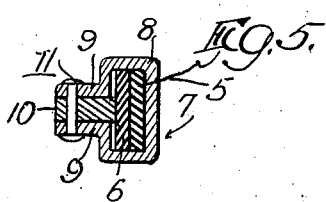
Fig. 5 is a vertical sectional view taken on line 5—5 of Fig. 2.

The particular clamp devices 7, 7 shown in the drawings are alike and each comprises a yoke 8 of a size and shape to receive the adjacent ends of the end and mid-sections 5, 6 of the bumper bar 1. In the yoke these sections overlap each other, as shown in Figs. 2 and 5. The end flanges 9, 9 of the yoke are spaced apart to receive between them an eccentric 10 mounted on a pin 11. The eccentric has a handle 12 by means of which it may be turned to clamp and unclamp the overlapped bar sections in the yoke 8.

With automobiles equipped with disk wheels it is the usual practice for the car owner to carry one and sometimes two extra wheels completely equipped with inflated tires at the rear of the machine on a spindle 13 fixed to the car body 14 or other fixed part of the car, as shown in Fig. 1. Two extra disk wheels are shown in this figure, the disk of the outermost wheel being indicated by 15 and the tires of both wheels being indicated by 16, 16. The spindle 13 extends rearward from the car body and has a length to carry two disk wheels. The thickness of these wheels with inflated tires thereon is such that when even one is carried by the spindle it projects beyond the rear line of the rear fenders 17, 17 with most makes of cars and prevents the use of bumpers as heretofore made at the rear ends. When bumpers as heretofore made can be employed, they fit so close to the machine that only one spare wheel can be carried on the spindle 13 and even then difficulty is encountered in removing and replacing a wheel on the spindle. The carrying of two spare wheels is out of the question with bumpers as heretofore made.

By having the bumper device made in accordance with my invention, there is a removable mid-section 6, which when taken off allows a clear space for the spare wheels 15 to pass through on being taken off and replaced on the spindle 13, so that none of the bumper construction interferes with that operation, and thus my bumper is particularly adapted for the rear ends of cars carrying spare wheels.

My construction is also readily applicable to cars carrying spare tires, as the rim is a part of the equipment and by having a clear space through the center of the bumper to work through removing the spare tire is greatly facilitated, The end parts 5, 5, of the bumper bar 1, as shown in the drawings, are bent to provide front and rear sections 5ᵃ, 5ᵇ. These extend inside of the guards 2 and are held in place by bolts 2ᵃ. These bumper sections extend through slotted blocks 2ᵇ of the kind shown and described in my copending application filed February 12, 1923, Serial No. 618,490, whereby adjustment of the end sections 5, 5 may be had to align the ends of the bumpers with the outer edges of the rear fenders 17, 17. Set screws 2ᶜ are used for clamping the bumper sections 5ᵃ, 5ᵇ to said blocks. Coiled springs 2ᵈ are between the blocks, as shown.

While I have shown and described herein in detail the bumper construction of my invention, it is to be of course understood that the details of construction and arrangement of parts may be variously changed and modified without departing from the spirit and scope of my invention.

I claim as my invention:

1. An automobile bumper construction, comprising horizontal bumper means having end sections and a removable mid-section, means for releasably clamping the mid-section to both end sections, and means included in the bumper construction for attaching the same to an automobile.

2. An automobile bumper construction, comprising horizontal bumper means having end sections and a removable mid-section, vertical guard members at the end sections and engaged therewith, means for releasably clamping the mid-section to the end sections, and means included in the bumper construction for attaching the same to an automobile.

3. An automobile bumper construction, comprising horizontal bumper means having end sections and a removable mid-section, vertical guard members at said end sections, said end sections having front and rear sections inside of said guard members and secured thereto, means for releasably clamping the mid-section to the end sections, and means included in the bumper construction for attaching the same to an automobile.

4. An automobile bumper construction, comprising a horizontal bumper bar having end sections and a removable mid-section, vertical guard members at the end sections, said guard members having front and rear sections, said end sections having front and rear sections inside of said guard members, blocks engaging the front and rear sections of said guard members and having slots to adjustably receive the front and rear sections of said end sections, means for clamping said end sections in said block, springs between the blocks, and clamps for releasably clamping the mid-section to the end sections.

5. An automobile bumper construction, comprising a horizontal bumper bar having end sections and a removable mid-section, clamp means employing eccentrics for releasably clamping the mid-section to the end sections, and means included in the bumper construction for attaching the same to an automobile.

6. An automobile bumper construction, comprising a horizontal bumper bar having end sections and a removable mid-section, means included in the bumper construction for attaching the same to an automobile, clamp means for releasably clamping the mid-section to the end sections, said clamp means each including a yoke to receive the bar sections in overlapped relation, an eccentric for clamping said sections in said yoke, and a handle for turning the eccentric.

7. The combination with an automobile having a spindle at its rear for carrying spare disk wheels with inflated tires, of horizontal bumper means carried by the automobile at its rear end and having end sections and a removable mid-section, the latter being removed to provide a clear space through the bumper means when taking the spare wheels from and replacing them on said spindle, and means for releasably clamping said mid-section to both end sections.

8. An automobile bumper construction, comprising horizontal bumper means, means adjacent the ends of said bumper means for attaching the latter to an automobile, means included in said bumper means for providing, when desired, a clear passage-way through the bumper means between said attaching means, and vertical bumper means carried by said horizontal bumper means.

9. An automobile bumper construction, comprising horizontal bumper means having end sections and a mid-section, means permitting the mid-section to the placed in a position providing a clear passage-way through the horizontal bumper means between said end sections, means at the end sections for attaching the bumper means to an automobile, and vertical bumper means carried by said horizontal bumper means.

10. An automobile bumper construction, comprising horizontal bumper means having end sections and a mid-section, means permitting the mid-section to be placed in a position providing a clear passage-way through the horizontal bumper means between said end sections, means at the end sections for attaching the bumper means to an automobile, and vertical bumper means extending above and below said mid and end sections and carried by the latter.

11. An automobile bumper construction, comprising a horizontal bumper bar having end sections and a removable mid-section, vertical guard members at the end sections, said guard members having front and rear sections, said end sections having front and rear sections inside of said guard members and joined together by looped portions at their outer ends, the inner ends of said front and rear sections being at said guard members, means attaching said end sections to said guard members, means for releasably clamping said mid-section to the front sections of said end sections, and means included in the bumper construction for attaching the same to an automobile.

In testimony that I claim the foregoing as my invention, I affix my signature this 27th day of November, A. D. 1922.

JOSEPH H. IGO.